United States Patent [19]

White

[11] 4,165,422

[45] Aug. 21, 1979

[54] ACYL CAPPED QUINONE-COUPLED POLYPHENYLENE OXIDES

[75] Inventor: Dwain M. White, Schenectady, N.Y.

[73] Assignee: General Electric Company, Schenectady, N.Y.

[21] Appl. No.: 800,644

[22] Filed: May 26, 1977

[51] Int. Cl.² .................. C08G 65/44; C08G 65/48
[52] U.S. Cl. .................. 525/397; 528/214; 528/215; 525/390; 528/212
[58] Field of Search .............. 260/47 ET; 528/212, 528/213, 214, 215

[56] References Cited

U.S. PATENT DOCUMENTS

| | | | |
|---|---|---|---|
| 3,375,228 | 3/1968 | Holoch et al. | 260/47 |
| 3,573,254 | 3/1971 | Factor | 260/47 |
| 3,736,291 | 5/1973 | Vogel | 260/47 R |
| 3,784,575 | 1/1974 | Rutledge | 260/396 R |
| 3,970,640 | 7/1976 | Yonemitsu et al. | 260/47 ET |
| 3,987,068 | 10/1976 | Reilly | 260/396 R |

*Primary Examiner*—Lester L. Lee
*Attorney, Agent, or Firm*—F. Wesley Turner; Joseph T. Cohen; Charles T. Watts

[57] ABSTRACT

New polymers comprising acyl capped quinone-coupled polyphenylene oxides are described. The resulting new polymers have improved color and in combination with styrene resins provide thermoplastic compositions having improved chemical and physical properties.

12 Claims, No Drawings

ACYL CAPPED QUINONE-COUPLED POLYPHENYLENE OXIDES

CROSS REFERENCE TO RELATED APPLICATIONS

This invention is related to subject matter disclosed in my copending U.S. application Ser. Nos. 800,635, 800,641, and 800,656, filed on May 26, 1977. All of the aforesaid applications are also my inventions and are assigned to the same assignee as the assignee of this application. All of the disclosures referenced above are incorporated herein in their entirety by reference.

BACKGROUND OF THE INVENTION

1. Field of the Invention

This invention relates to acyl capped quinone-coupled polyphenylene oxides.

2. Description of the Prior Art

Hay et al., U.S. Ser. No. 613,072, now U.S. Pat. No. 4,048,143 discloses the capping of polyphenylene oxides having an average hydroxyl group per molecule of 1.0 or less as described in various U.S. patent applications including Hay's U.S. Pat. Nos. 3,306,879, 3,914,266; application Ser. No. 540,473, filed Jan. 13, 1975, now U.S. Pat. No. 4,028,341; a continuation-in-part of Ser. No. 441,295, filed Feb. 11, 1974, now abandoned; and Olander's U.S. Pat. Nos. 3,956,442, 3,965,069, 3,972,851; and Ser. No. 582,910, filed June 2, 1975, now U.S. Pat. No. 4,054,553. All the Hay and Olander disclosures referenced above are incorporated herein in their entirety by reference.

In my copending U.S. patent application Ser. No. 800,635, new quinone-coupled polyphenylene oxides having an average hydroxyl group per molecule value greater than 0, including 2.0 or less are described. These new polymers can be acyl capped to form new polymers having increased oxidative and thermal stability.

DESCRIPTION OF THE INVENTION

This invention embodies new acyl capped quinone-coupled polyphenylene oxides having increased oxidative and thermal stability.

Broadly, the acyl capped quinone-coupled polyphenylene oxides are illustrated by the formula:

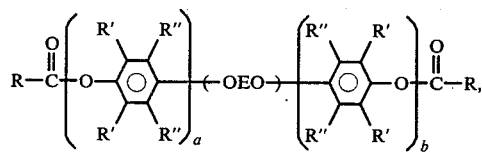

wherein independently each $-\!\!+\!\!OEO\!\!+\!\!-$ is a divalent quinone residue, E is a divalent arene radical, either a or b is at least equal to 1, the sum of a plus b is at least equal to 10, preferably 40 to 500, X is hydrogen, chlorine, bromine, or iodine, R' is hydrogen, a hydrocarbon radical, a halohydrocarbon radical having at least 2 carbon atoms between the halogen atoms and phenol nucleus, a hydrocarbonoxy radical, or a halohydrocarbonoxy radical having at least two carbon atoms between the halogen atoms and phenol nucleus, R" being the same as R' and, in addition, halogen, R is alkyl, cycloalkyl, aryl or mixtures thereof. A presently preferred acyl capped quinone-coupled polyphenylene oxide is of formula (I) above wherein independently each R' is hydrogen, a hydrocarbon radical, a halohydrocarbon radical, and even more preferably is a methyl radical, R" being hydrogen.

Broadly, the acyl capped quinone-coupled polyphenylene oxides can be prepared by reacting a quinone-coupled polyphenylene oxide with an acylating capping agent as described in Loucks et al. U.S. application, Ser. No. 800,646, filed May 26, 1977. Illustrative of quinone-coupled polyphenylene oxides are compounds of the following formula:

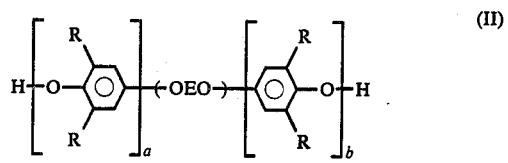

wherein independently each $-\!\!+\!\!OEO\!\!+\!\!-$ is a divalent quinone residue, E is a divalent arene radical, either a or b is at least equal to 1, the sum of a plus b is preferably at least equal to 10, more preferably 40 to 500, and R is hydrogen, a hydrocarbon radical, a halohydrocarbon radical, a hydrocarbonoxy radical or a halohydrocarbonoxy radical.

Illustrative of acylating capping agents are compounds of the following formulae:

including mixtures thereof, wherein R as defined hereinbefore is alkyl, cycloalkyl, aryl or mixtures thereof, such as alkaryl, alkcycloalkyl, aralkyl, arcycloalkyl, cycloalkaryl, etc., and X is chlorine, bromine, fluorine or iodine. Preferred R groups contain from about 1 to about 30 carbon atoms, and more preferably contain from about 1 to about 20 carbon atoms.

Representative examples of specific acylating capping agents include the following:

(A) monoacyl halides of formula (III) above, e.g. acetyl fluoride, acetyl chloride, acetyl bromide, the propionyl halides, butyryl halides, stearoyl halides, benzoyl chloride, tuluoyl halides, naphthoyl halides, cinnamoyl halides, etc.;

(B) anhydrides of monocarboxylic acids of formula (IV) above, e.g. acetic anhydride, propionic anhydride, octanoic anhydride, benzoic anhydride, toluic anhydride, butyric anhydride, pivalic anhydride, m-dichlorobenzoic anhydride, 2,3,4,5,6-tentachlorobenzoic anhydride, pentaoic anhydride, palmatoic anhydride, stearic anhydride, etc.;

Broadly, the acyl capped quinone-coupled polyphenylene oxides can be prepared by contacting a quinone-coupled polyphenylene oxide with an acylating capped agent in the presence of an aqueous solution of a water soluble base and a catalytic phase transfer agent. Any amount of acylating agent can be employed. however, for obvious reasons, economic primarily, the amount of acylating agent employed is preferably the stoichiometric amount required to react with all of the hydroxyl groups associated with the reaction products of quinone-coupled polyphenylene oxides. Accordingly, the quantities of acylating agent employed can vary from 1/10 to 1/100 or 1/000 times the stoichiometric requirements required to completely cap all of the hydroxyl groups associated with the polymer. Excess capping agent is advantageously employed when a quinone-coupled polymer reaction medium contains primary, secondary or tertiary amines, on a weight basis, in excess of 1½ to 2% based on the weight of polymer, since undesirable competitive side reactions can occur involving amines and the capping agent.

Illustratively, any water soluble base can be employed to prepare my compositions, e.g. any aqueous solution of an alkaline metal or alkaline earth metal hydroxide or carbonate. Specific examples include aqueous solutions of potassium hydroxide, sodium hydroxide, sodium monocarbonate, barium carbonate, etc. Any amount of water soluble base can be employed, however, generally effective mole proportions relative to the amount of acylating agent that can be employed effectively are acylating agent:water soluble base proportions of from about 1:100 to about 50:1 and more frequently within the range of from about 1:10 to about 10:1.

Illustratively, any catalytic phase transfer agent can be employed to prepare my compositions, e.g. any quaternary ammonium, quaternary phosphonium, tertiary sulfonium compound, or mixture thereof. Specific examples can be described by the formulas:

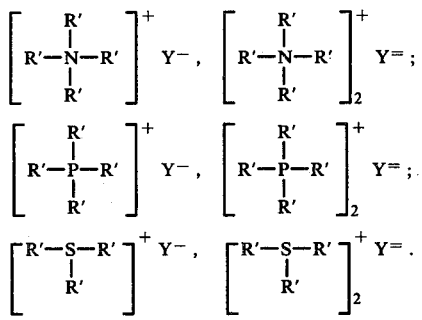

Any amount of phase catalytic phase transfer agent can be employed relative to the amount of water soluble base and effective molar proportions of catalytic phase transfer agent to water soluble base are within the range of from about 1:10 to about 1:1000 and more frequently within the range of from 1:100 to 1:1000.

The acylating reaction can be carried out at any reaction temperature but preferably is carried out at temperatures within the range of from 0° to 150° C. or even higher, more preferably from 50° C. to 100° C.

EXAMPLE I

(A) Polymer Preparation

A 2.5 gallon stainless steel reactor equipped with an air-driven paddle stirrer, oxygen inlet tube, and water-cooled coil and jacket was charged with 5.48 l. toluene, 121.2 ml. of a stock catalyst solution, i.e. (29.5 ml. bromine added slowly to a chilled solution of 7.76 g. cuprous oxide and 132.0 g. 2,6-xylenol in methanol, then diluted to 1.0 l.), 4.51 g. N,N'-di(t-butyl)ethylenediamine (DBEDA), 26.5 g. N,N-dimethylbutylamine (DMBA), and 1.60 g. di(n-butyl)amine (DBA). Oxygen was bubbled into the resulting admixture at a rate of 10 SCFH while vigorously agitating the admixture, 1600 g. of 2,6-xylenol dissolved in 1.8 l. toluene was pumped into the reactor over a 30 minute period. Summarily, the reaction parameters relative to molar ratios of 2,6-xylenol:Cu:DBEDA:DMBA:Br:DBA were as follows: 1000:1:2:20:8:9.4. The reaction temperature was maintained at 25° C. throughout the monomer addition, and was increased to and maintained at 40° C. until the reaction was terminated.

(B) Catalyst Deactivation

The reaction was terminated after 58 minutes (measured from start of monomer addition) by replacing oxygen with nitrogen and the addition of 16.0 ml. 38% Na₃EDTA in water. Polymer analysis showed an [η] equal to 0.59 dl./g. and an OH absorbence of 0.042 units.

(C) Quinone Coupling

The resulting TMDQ containing reaction mixture was heated under nitrogen at 50° to 60° C. for 30 minutes and then at 95° C. for 15 minutes. At this point the mixture no longer exhibited the characteristic TMDQ color. Polymer analysis after methanol precipitation, washing and drying the polymer sample collected on a filter, washed with methanol and dried in a circulating air oven at 80° C. showed an [η] equal to 0.53 dl./g., and an OH absorbance of 0.139 units.

(D) Acyl Capping (1) One-half of the resulting quinone-coupled polyphenylene oxide reaction mixture was cooled to 60° C., transferred to a 2.5 gallon stainless steel reactor equipped with a high-shear stirrer (Polytron homogenizer), nitrogen inlet tube and heating coils. 35.5 ml. of a 10% solution of Aliquat ® 336 in toluene and 16.7 g. 50% aqueous NaOH was added. The mixture was stirred vigorously under nitrogen for 2 minutes and then 19.7 ml. acetic anhydride in 30 ml. toluene was added over a 3 minute period. The reaction mixture was diluted with an equal volume of toluene, washed with an equal volume of water and passed through a liquid-liquid centrifuge to remove the aqueous phase. Methanol was added to precipitate the acetate capped polymer. Polymer analysis after methanol washing and drying showed an intrinsic viscosity [η] equal to 0.53/dl./g. as measured in chloroform at 25° C., a hydroxyl end group infrared absorbtion at 3610 cm.$^{-1}$ of 0.004, and a nitrogen content of 1038 ppm.

(2) The remaining half of the resulting quinone-coupled polyphenylene oxide reaction mixture was acetylated and washed as described in (D)(1) above, then isolated by steam precipitation by spraying the capped quinone-coupled polyphenylene oxide reaction mixture with steam through a nozzle into water at 95° C. at a rate sufficient to provide rapid azeotropic removal of toluene and other materials such as amines. The steam precipitated solid polymer is collected on a filter, washed with additional water and dried at 90° C. in a circulating air oven. Polymer analysis showed an intrinsic viscosity [η] equal to 0.53 dl./g., and OH absorbance at 3610 cm.$^{-1}$ of 0.001 units, in a nitrogen content of 1267 ppm.

A summary of polymer processing and results are set out in Table I hereafter:

TABLE I

| Process Step(s) | Reaction Temp. °C. | [η] dl./g. | OH Absorbance @ 2610 cm.$^{-1}$ |
|---|---|---|---|
| (A) Polymer Preparation, and | | | |

TABLE I-continued

| Process Step(s) | Reaction Temp. °C. | [η] dl./g. | OH Absorbance @ 2610 cm.$^{-1}$ |
|---|---|---|---|
| (B) Catalyst Deactivation | 25–40 | 0.59 | 0.042 |
| (C) Quinone Coupling | 50–95 | 0.53 | 0.139 |
| (D) Acyl Capping | 60 | | |
| (1) Methanol precipitation | | 0.53 | 0.004 |
| (2) Steam precipitation | | 0.53 | 0.001 |

As illustrated by the foregoing examples, acyl halides can be reacted with quinone-coupled polyphenylene oxides to form acyl capped quinone-coupled polyphenylene oxides. Preferred acyl capped polymers are polymers wherein substantially all available hydroxyl components have been end capped so that the hydroxyl content of the resulting polymer is essentially nil.

The acyl capped quinone-coupled polyphenylene oxides can have any intrinsic viscosity and any number average molecular weight $\overline{M}_n$. Presently preferred polymers generally have an $\overline{M}_n$ value of 5,000 to 60,000, more preferably 15,000 to 30,000, having generally corresponding intrinsic viscosities of 0.17 to 1.7, and 0.4 to 0.7, respectively.

The polymers of this invention can be combined with other fillers, modifying agents, etc., such as dies, pigments, stabilizers, flame retardant additives with beneficial results.

I claim:

1. An acyl capped quinone-coupled polyphenylene oxide of the formula:

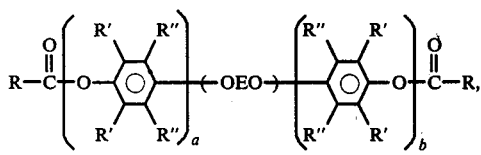

wherein independently each -(-OEO-)- is a divalent quinone residue, E is a divalent arene radical, either a or b is at least equal to 1, R' is hydrogen, a hydrocarbon radical, a halohydrocarbon radical having at least 2 carbon atoms between the halogen atoms and phenol nucleus, a hydrocarbonoxy radical, or a halohydrocarbonoxy radical having at least two carbon atoms between the halogen atoms and phenol nucleus, R" being the same as R' and, in addition, halogen, and R is an alkyl, cycloalkyl or aryl radical.

2. A claim 1 compound, wherein -(-OEO-)- is of the formula:

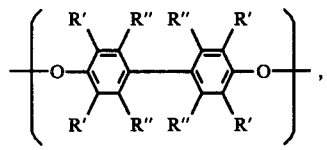

wherein R' and R" are as defined hereinbefore.

3. A claim 1 compound, wherein the sum of a plus b is at least equal to 10.

4. A claim 1 compound, wherein the sum of a plus b is equal to 40 to 500.

5. A claim 1 compound, wherein each R' is hydrogen, a hydrocarbon radical, or a halohydrocarbon radical.

6. A claim 5 compound, wherein each R and R' is a methyl radical and R" is hydrogen.

7. A process for capping quinone-coupled polyphenylene oxides which comprises contacting quinone-coupled polyphenylene oxides with a capping agent selected from the class consisting of monoacyl halides, monosulfonyl halides, anhydrides of monocarboxylic acids, alkyl halides, or dialkylsulfates, wherein said contacting is carried out at a temperature within the range of from about 0°–150° C. in the presence of a water soluble base and a catalytic phase transfer agent.

8. A claim 7 process, wherein the quinone-coupled polyphenylene oxide is of the formula

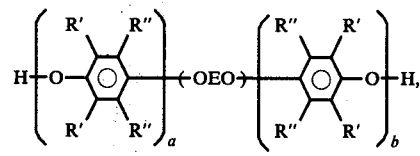

wherein independently each -(-OEO-)- is a divalent quinone residue, E is a divalent arene radical, either a or b is at least equal to 1, R' is hydrogen, a hydrocarbon radical, a halohydrocarbon radical having at least 2 carbon atoms between the halogen atoms and phenol nucleus, a hydrocarbonoxy radical, or a halohydrocarbonoxy radical having at least two carbon atoms between the halogen atoms and phenol nucleus, R" being the same as R' and, in addition, halogen, and wherein the monoacyl halides, monosulfonyl halides, anhydrides of monocarboxylic acids, alkyl halides, and dialkylsulfates are of the formulae, respectively:

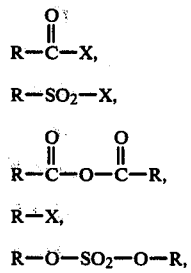

including mixtures thereof, wherein R is alkyl, cycloalkyl, aryl or mixtures thereof, and X is chlorine, bromine, fluorine, or iodine.

9. A claim 8 process, wherein the water soluble base is selected from alkali metal or alkaline earth metal hydroxide or carbonate bases and the catalytic phase transfer agent is selected from quaternary ammonium, quaternary phosphonium, tertiary sulfonium compounds or mixtures thereof.

10. A claim 9 process, wherein R' is hydrogen, a hydrocarbon or a halohydrocarbon radical and the sum of a plus b is at least 10.

11. A claim 10 process, wherein each R' is a hydrocarbon radical and the sum of a plus b is 40 to 170.

12. A claim 11 process, wherein each R and R' is a methyl radical.

* * * * *